United States Patent [19]

Ziu

[11] Patent Number: 5,482,088
[45] Date of Patent: Jan. 9, 1996

[54] SUPPORTS DOUBLE-CONTAINMENT SYSTEMS WITH AXIAL-GUIDING AND FLEXIBILITY

[75] Inventor: Christopher G. Ziu, 227 E. Lafayette St., Easton, Pa. 18042

[73] Assignee: Christopher G. Ziu, Merrimack, N.H.

[21] Appl. No.: 89,745

[22] Filed: Jul. 9, 1993

[51] Int. Cl.⁶ .................................................. F16L 9/18
[52] U.S. Cl. ........................... 138/113; 138/110; 138/111; 285/114; 285/136; 285/179
[58] Field of Search ...................... 138/110, 103, 138/104, 113, 114, 148, 108, 111; 285/114, 136, 179

[56] References Cited

U.S. PATENT DOCUMENTS

| | | | |
|---|---|---|---|
| 1,140,633 | 5/1915 | Trucano . | |
| 1,160,703 | 11/1915 | Fleming . | |
| 1,737,161 | 11/1929 | Jupp | 138/113 |
| 1,824,717 | 9/1931 | Harty et al. | 138/113 |
| 2,475,635 | 7/1949 | Parsons . | |
| 3,207,533 | 9/1965 | Van Gundy et al. | 285/31 |
| 3,530,680 | 9/1970 | Gardner | 138/113 |
| 3,730,228 | 5/1973 | Gibbs, Sr. | 138/106 |
| 3,865,145 | 2/1975 | McKay et al. | 138/113 |
| 4,023,831 | 5/1977 | Thompson | 285/31 |
| 4,049,480 | 9/1977 | Kutschke | 156/94 |
| 4,098,476 | 7/1978 | Jutte et al. | 138/113 |
| 4,108,476 | 8/1978 | Krupp | 285/47 |
| 4,135,401 | 1/1979 | Le Breton | 138/113 |
| 4,219,224 | 8/1980 | Hanley | 138/113 |
| 4,223,702 | 9/1980 | Cook | 138/106 |
| 4,521,037 | 6/1985 | Knox | 285/15 |
| 4,560,188 | 12/1985 | Berti et al. | 285/47 |
| 4,667,505 | 5/1987 | Sharp | 73/40.5 |
| 4,779,652 | 10/1988 | Sweeney | 138/113 |
| 4,786,088 | 11/1988 | Ziu | 285/138 |
| 4,805,444 | 2/1989 | Webb | 73/40.5 |
| 4,886,305 | 12/1989 | Martin | 285/133.1 |
| 4,930,544 | 6/1990 | Ziu | 138/113 |
| 5,018,260 | 5/1991 | Ziu | 24/555 |
| 5,085,471 | 2/1992 | Ziu | 285/133.1 |
| 5,186,502 | 2/1993 | Martin | 138/113 |
| 5,197,518 | 3/1993 | Ziu | 138/113 |
| 5,277,242 | 1/1994 | Arrington | 138/113 |
| 5,348,352 | 9/1994 | Ciez et al. | 285/136 |

Primary Examiner—James E. Bryant, III
Attorney, Agent, or Firm—McCormick, Paulding & Huber

[57] ABSTRACT

A double-containment piping assembly has two anchor supports, and at least one elbow fitting with an outer elbow section and an inner elbow section received within the inner elbow section. A first leg having a first inner pipe received within a first outer pipe is coupled between an anchor support and the elbow fitting. A second leg having a second inner pipe received within a second outer pipe is coupled between the other anchor support and the other side of the elbow fitting. First flexibility supports are mounted on either side of the elbow fitting, and permit axial and lateral movement of the inner pipe relative to the outer pipe in the areas of the elbow. First axial-guiding supports, which permit axial movement of the inner pipe relative to the outer pipe, but prevent lateral movement of the inner pipe, are each mounted a minimum distance from the elbow fitting between the inner and outer pipes. Any differential expansion of the inner and outer pipes relative to each other accumulates at the elbow fitting, and is absorbed by movement of the inner elbow section relative to the outer elbow section.

23 Claims, 5 Drawing Sheets

SUPPORTS DOUBLE-CONTAINMENT SYSTEMS WITH AXIAL-GUIDING AND FLEXIBILITY

FIELD OF THE INVENTION

The present invention relates to double-containment assemblies including inner piping or conduits located within outer piping, conduits or containment components, and more particularly, to such double-containment assemblies designed to permit movement of the inner piping components and the outer containment components relative to each other in response to events such as differential thermal expansion or contraction.

BACKGROUND INFORMATION

There are numerous systems available providing a double or dual-containment assembly including inner or primary pipes contained within outer or secondary containment pipes to transport dangerous or hazardous fluids within the inner pipes. In the event of a leak or emission of fluid or vapors from the inner pipes, the leaking substance is intended to be safely contained within the outer pipes. Historical applications for such double-containment systems are found in the nuclear, gas and petroleum refining, and chemical processing industries. It is also known to provide certain types of detectors and/or drainage devices in the annulus between the inner and outer piping components in the event that there is leakage, for the detection and/or collection of such leakage.

Differential thermal expansion in double-containment systems occurs when the inner and outer piping components expand or contract to different degrees, or at different rates relative to each other. Almost all double-containment systems are subject to changes in temperature during operation, and/or to differences in operating temperature between the inner and outer piping components. This causes differential thermal expansion or contraction of the inner and outer piping components relative to each other, thus causing the inner and outer piping components to move relative to each other.

When the inner piping components expand or contract relative to the outer piping components, and if the inner piping components are installed in an axially unrestrained manner, the deflection of the primary piping due to the expansion or contraction of the primary piping accumulates at the elbow sections of the primary piping. In this case, the inner elbow sections are subjected to bending and/or torsional movements relative to the outer elbow sections. Although elbow fittings by their nature are capable of greater flexibility than comparable straight sections of pipe, when elbow sections are subjected to bending and/or torsional movements, stresses are intensified, and in some instances, this intensification can lead to failure.

In many known double-containment systems, the inner piping components are not permitted to bend or otherwise move either laterally and/or axially relative to the outer piping components, particularly in the area of the elbows. Rather, the straight sections of inner piping are restrained by interstitial supports or other types of fittings within the outer piping components, and/or the inner elbow sections are restrained by fittings relative to the outer elbow sections or are attached to the outer elbow sections, preventing movement of the inner and outer elbow sections relative to each other.

In some known double-containment systems, the inner piping components may be able to move axially relative to the outer piping components, but the elbow fittings do not permit movement of the inner elbow sections relative to the outer elbow sections. The elbow sections become points of restraint, which can lead to failure when there is differential thermal expansion or contraction.

In other known double-containment systems, the inner piping components may be able to move relative to the outer piping components, but only within narrow limits, and once these narrow limits are exceeded, the inner piping components come into contact with the outer piping components. This is frequently the case when standard or off-the-shelf short-radius/short-radius combinations of elbow fittings are employed to make double-containment elbow fittings, which has been a common practise to date in the double-containment industry. Because the centerline radius of the inner elbow section is less than the centerline radius of the outer elbow section, there is less space between the larger-radius surfaces than between the smaller-radius surfaces within the annulus between the inner and outer elbow sections. As a result, when the most common types of differential thermal expansion or contraction occur, i.e., when the inner piping expands toward the outer piping or when the outer piping contracts toward the inner piping, there is contact between the inner and outer piping components. The elbow fittings are therefore not permitted to fully bend or flex in response to differential thermal expansion or contraction, but rather essentially behave as internal anchors, and become points of restraint, which frequently leads to premature failure.

It is typically necessary in double-containment piping systems to provide support for the primary piping by positioning one or more interstitial supports between the primary and outer containment sections of straight pipe, thus employing the structural integrity of the outer containment piping to support the primary piping through such interstitial supports. Typically, multiple interstitial supports are used, and the spacing between the interstitial supports is selected based on the longest span of primary piping that can be allowed before the primary piping sags or deflects beyond a maximum allowable deflection. The degree of deflection of the primary piping depends upon the weight of the primary piping, the weight of the fluid transported through the primary piping, the internal pressure and temperature of the primary piping, the material of construction of the primary piping, and the amount of temperature change experienced during operation of the primary piping. The temperature change is determined based on the temperature condition of the double-containment pipe assembly at the completion of construction in comparison to the high or low temperatures that it will experience when in service.

As described above, almost all chemical and petroleum product piping systems are subject to changes in temperature during operation, and during such temperature changes, there can be relatively substantial expansion and/or contraction of the primary piping relative to the outer containment piping causing the inner piping to move axially, radially and/or laterally relative to the outer containment piping. Typically, the interstitial supports in known double-containment systems do not accommodate for such relative movements, or the selection and/or location of such interstitial supports within the double-containment systems does not adequately compensate for such relative movements. As a result, significant stress is induced within such double-containment systems, which frequently can lead to a rupture or other failure of the primary piping or outer containment piping.

Accordingly, in double-containment systems developed to date, there has been insufficient means (and in many instances no means) for accommodating or alleviating differential thermal expansion and/or contraction of the inner and outer piping components relative to each other, and as a result, such systems have operated as restrained systems, developing large axial stresses, which can lead to failure, and leakage of hazardous fluids or vapors.

SUMMARY OF THE INVENTION

The present invention is directed to a double-containment assembly, comprising a first anchor support, and at least one elbow fitting including an inner elbow section contained within an outer elbow section, and defining an unobstructed annulus between the inner and outer elbow sections permitting movement of the inner elbow section relative to the outer elbow section. A first inner pipe section is coupled between the first anchor support and the inner elbow section, and a first outer pipe section is coupled between the first anchor support and the outer elbow section. A first axial-guiding support is spaced a first predetermined distance from the at least one elbow fitting for supporting the first inner pipe section within the first outer pipe section, and includes means for permitting axial movement of the first inner pipe section and first outer pipe section relative to each other, and for substantially preventing lateral movement of the first inner pipe section relative to the first outer pipe section. A first flexibility support is spaced a second predetermined distance from the elbow fitting less than the first predetermined distance, for supporting the first inner pipe section within the first outer pipe section, and includes means for permitting axial and lateral movement of the first inner pipe section relative to the first outer pipe section.

In one embodiment of the present invention, the double-containment assembly further comprises a second anchor support, and a second inner pipe section coupled between the second anchor support and the inner elbow section on the opposite side of the inner elbow section relative to the first inner pipe section. A second outer pipe section is coupled between the second anchor support and the outer elbow section on the opposite side of the outer elbow section relative to the first outer pipe section. A second axial-guiding support is spaced a third predetermined distance from the elbow fitting for supporting the second inner pipe section within the second outer pipe section, and includes means for permitting axial movement of the second inner pipe section and second outer pipe section relative to each other, and for substantially preventing lateral movement of the second inner pipe section relative to the second outer pipe section. A second flexibility support is spaced a fourth predetermined distance measured from the elbow fitting, which is less than the third predetermined distance, for supporting the second inner pipe section within the second outer pipe section, and includes means for permitting axial and lateral movement of the second inner pipe section relative to the second outer pipe section.

The present invention is also directed to a method of assembling a double-containment assembly, comprising the steps of: a) selecting the location of a first anchor support relative to a first elbow fitting, and coupling first inner and outer pipe sections between the first anchor support and corresponding first inner and outer elbow sections of the first elbow fitting; b) coupling second inner and outer pipe sections to the other side of each inner and outer elbow section; c) determining an expected overall change in linear dimension due to temperature changes for i) the first inner and outer pipe sections, and ii) the second inner and outer pipe sections; d) comparing the expected overall change in linear dimension for each of the first inner and outer pipe sections, and second inner and outer pipe sections to the distance in the axial directions of each of the first and second pipe sections between the inner and outer elbow sections; and e) selecting an elbow fitting with sufficient space between the inner and outer elbow sections in the axial direction of either the first or second pipe sections to accommodate the expected change in linear dimension of each pipe section.

One embodiment of the present invention further comprises the steps of determining a first minimum distance of a first axial-guiding support mounted between the first inner and outer pipe sections from the elbow fitting, wherein the first minimum distance is based on the expected overall change in linear dimension due to temperature changes of the second inner and outer pipe sections, and installing the first axial-guiding support at a location greater or equal to the first minimum distance if the distance between the elbow fitting and the first anchor support is greater than the first minimum distance.

Preferably, the method of the present invention further comprises the step of mounting a first flexibility support between the first inner and outer pipe sections a second minimum distance from the elbow fitting, wherein the second minimum distance is less than the first minimum distance.

One advantage of the present invention, is that any differential thermal expansion or contraction of the inner piping components and outer piping components relative to each other accumulates at the elbow fitting between the internal anchors. The elbow fitting absorbs the differential thermal expansion or contraction by movement of the inner elbow section and outer elbow section relative to each other, without contacting each other. The flexibility supports are mounted adjacent to the elbow fittings to permit axial, lateral, and if necessary, radial movements of the inner piping relative to the outer piping in the areas of the elbows. The axial-guiding supports permit only axial movement of the inner piping relative to the outer piping to substantially concentrically guide the inner piping through the outer piping, and ensure that the distortion of the inner piping remains within design limits. Each of the piping components in the assembly of the present invention, is thus selected and located to accommodate differential thermal expansion or contraction of the inner and outer piping components relative to each other, without permitting the inner and outer piping to contact each other, which can lead to failures normally associated with prior double-containment assemblies.

Other advantages of the present invention will become apparent in view of the following detailed description and accompanying drawings.

DETAILED DESCRIPTION

Figures 1, 1A, 1B:
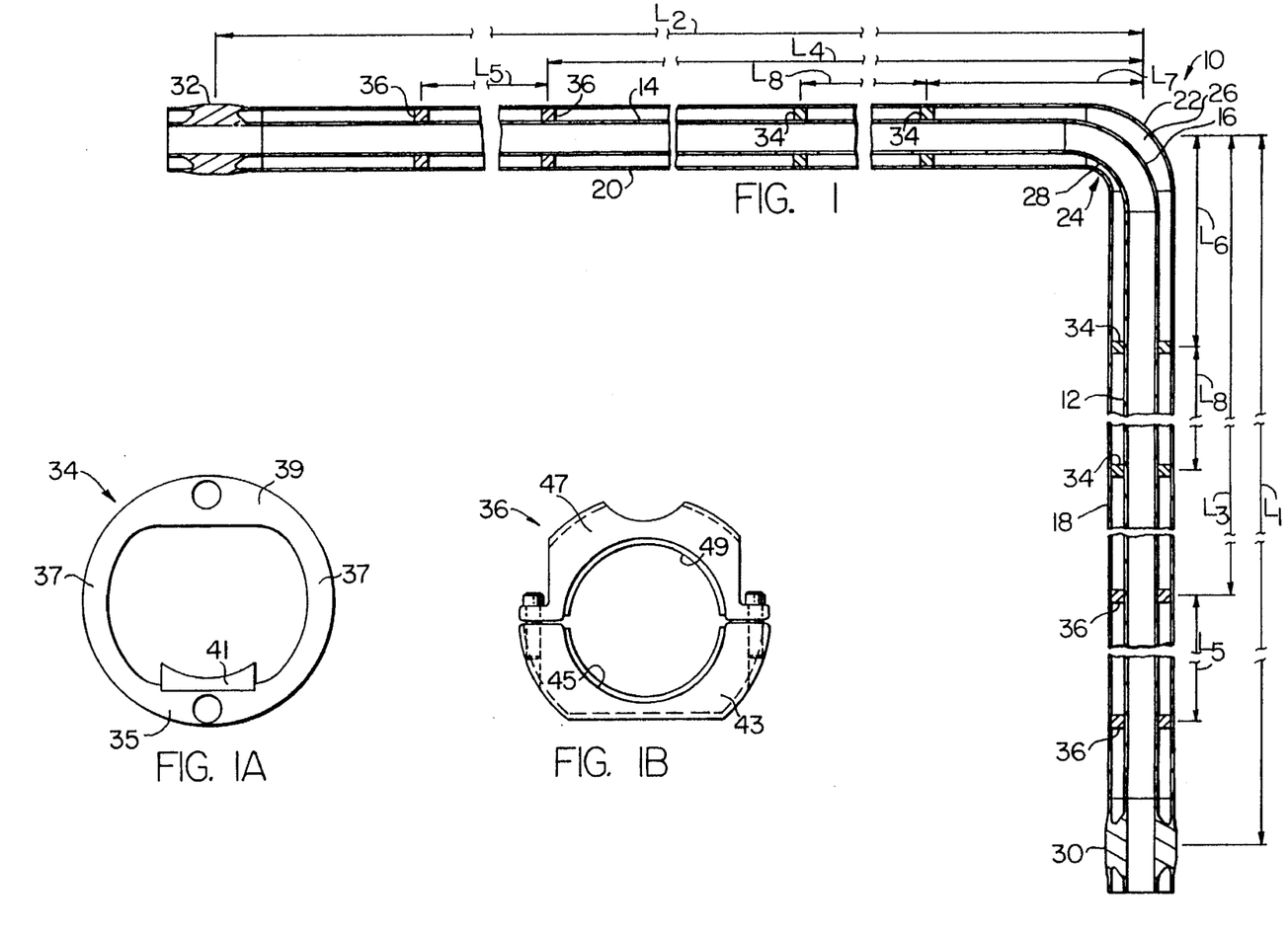
FIG. 1 is a partial schematic, cross-sectional view a double-containment assembly embodying the present invention.
FIG. 1A is a plan view of a typical flexibility support employed in the double-containment assembly of FIG. 1.
FIG. 1B is a plan view of a typical axial-guiding support employed in the double-containment assembly of FIG. 1.

In FIG. 1, a double-containment assembly embodying the present invention is indicated generally by the reference numeral 10. The double-containment assembly 10 comprises a plurality of sections of inner or primary pipe contained within outer secondary or containment pipe, including a first section of inner pipe 12 coupled to a second section of inner pipe 14 by an inner elbow section 16. The first inner pipe section 12 is contained within a first outer pipe section 18, and the second inner pipe section 14 is contained within a second outer pipe section 20. The outer pipe sections 18 and 20 are coupled together by an outer elbow section 22 containing the inner elbow section 16, and forming an elbow fitting indicated generally by the reference numeral 24.

The elbow fitting 24 is preferably of the type disclosed in the co-pending U.S. patent application filed on the same date as the present patent application in the name of Christopher G. Ziu, entitled "Elbow Fittings With Expanded Outer Annulus Space For Double-Containment Assemblies", which filed Jul. 9, 1993 and accorded application Ser. No. 08/089,798, is hereby expressly incorporated by reference as part of the present disclosure. As can be seen in FIG. 1, there is a larger distance between the larger-radius surfaces than between the smaller-radius surfaces of the inner elbow section 16 and the outer elbow section 22, defining an expanded or relatively wide outer annulus space 26 in comparison to a more narrow inner annulus space 28. In most instances of differential thermal expansion or contraction of the inner and outer piping components relative to each other, the inner piping components expand and in turn cause the inner elbow section to move outward toward the outer elbow section, or the outer piping components contract and in turn cause the outer elbow section to move inward toward the inner elbow section. In either case, the relative movement of the inner and outer piping components occurs within the outer annulus space, and the relatively wide outer annulus space 26 is sufficient to accommodate such movement without permitting the inner and outer elbow sections to contact each other, and possibly lead to failure, as is often the case with prior double-containment assemblies.

Other types of elbow fittings may also be used in the double-containment assemblies of the present invention; for example, the elbow fittings described in co-pending patent U.S. application Ser. No. 07/859,278, filed Mar. 26, 1992, entitled "Elbow Fittings For Double Containment Pipe Assemblies", which is a continuation of U.S. application Ser. No. 07/681,324, filed Apr. 4, 1991, now abandoned, and which is hereby expressly incorporated by reference as part of the present disclosure. These elbow fittings also suitably permit movement of the inner piping and inner elbow section and the outer piping and outer elbow section relative to each other to accommodate differential thermal expansion or contraction. In these fittings, the curved portion of the inner elbow section is concentric with the curved portion of the outer elbow section, defining a substantially uniform and unobstructed space throughout the annulus between the inner and outer elbow sections to permit the necessary movement of the inner and outer elbow sections relative to each other in response to differential thermal expansion or contraction.

The first inner pipe section 12 and first outer pipe section 18 are each coupled on the end opposite the elbow fitting 24 to an intermediate internal anchor, which in this embodiment of the present invention is a first termination fitting 30. Similarly, the second inner pipe section 14 and second outer pipe section 20 are each coupled on the end opposite the elbow fitting 24 to a second termination fitting 32. The termination fittings 30 and 32 each act as an internal anchor, preventing movement of the inner and outer piping components relative to each other in the direction of the respective termination fitting. Thus, any expansion or contraction of the first and second inner and outer pipe sections is permitted to occur between the first and second termination fittings 30 and 32, respectively. Accordingly, if either the first or second inner pipe sections 12 or 14 undergo expansion, the growth of the inner pipes accumulates at the elbow fitting 24, and is absorbed at the elbow fittings by movement of the inner elbow section 16 outward toward the outer elbow section 22 within the expanded outer annulus space 26. Similarly, if there is contraction of the outer piping components relative to the inner piping components, the decrease in length of the outer piping is absorbed by the elbow fitting 24, by movement of the outer elbow section 22 inward toward the inner elbow section 28 within the outer annulus space 26. As shown in FIG. 1, the termination fittings 30 and 32 each terminate the annulus space between the respective inner and outer piping components by means of a solid annulus portion located between the inner and outer flanges of the fitting. In many instances, however, flow passages are formed through the annulus portion to permit the flow of fluid or vapors through the fittings into an annulus on the other side of each fitting.

The internal anchors 30 are preferably of the type disclosed in U.S. Pat. No. 5,141,261, dated Aug. 25, 1992, entitled "Double Containment Pipe Joint Assembly", or of the type disclosed in U.S. patent application Ser. No. 07/934,705, filed Aug. 24, 1992, entitled "Double Containment Pipe Joint Assembly", which is a continuation-in-part of patent application Ser. No. 07/681,331, filed Apr. 4, 1991, now U.S. Pat. No. 5,141,261, each of which is hereby expressly incorporated by reference as part of the present disclosure. Another type of intermediate anchor that may equally be employed as the fittings 30 and/or 32 is disclosed in U.S. Pat. No. 5,085,471, dated Feb. 4, 1992, entitled "Double Containment Pipe Joint Assembly", which is also hereby expressly incorporated by reference as part of the present disclosure. Many of these preferred internal anchors are not termination fittings, but rather include flow passages for the flow of fluid within the annulus through the fittings.

The double-containment assembly 10 also includes a plurality of flexibility supports 34 supporting the first inner pipe section 12 within the first outer pipe section 18 and the second inner pipe section 14 within the second outer pipe section 20. The first flexibility support 34 on each side of the elbow fitting 24 is spaced a predetermined distance away from the elbow fitting, and the successive flexibility supports 34 are substantially equally spaced a predetermined distance relative to each other on the other side of the first flexibility support relative to the elbow fitting 24. The flexibility supports 34 permit axial, lateral, and if necessary, they can be designed to permit radial movement of the inner piping components relative to the outer piping components. This ability to permit relative movement of the inner piping components in both the lateral and axial directions (and if necessary, in radial directions) is particularly advantageous in the areas adjacent to the elbow fittings to adequately accommodate differential thermal expansion and contraction of the inner and outer piping components relative to each other.

The flexibility supports 34 are preferably of the type disclosed in co-pending patent application Ser. No. 07/722,083, filed Jun. 27, 1991, now U.S. Pat. No. 5,197,518, dated Mar. 30, 1993, entitled "Centering Support Assembly For Double Containment Pipe Systems", and U.S. patent application Ser. No. 08/037,083, filed Mar. 25, 1993, entitled "Centering Support Assembly For Double Containment Pipe Systems", which is a continuation-in-part of patent application Ser. No. 07/722,083, now U.S. Pat. No. 5,197,518, which are each hereby expressly incorporated by reference as part of the present disclosure.

A typical flexibility support 34 is illustrated in FIG. 1A, and includes a base portion 35, a pair of stanchion portions 37 formed on either side of the base portion 35, and a cross-piece portion 39 extending between the other ends of the stanchion portions 37. A saddle portion 41 is mounted on the base portion 35, and defines a curved surface for seating the inner piping 12 or 14. The saddle portion 41 is movable relative to the base portion 35 between the stanchion portions 37 to permit lateral movement of the inner piping relative to the outer piping. If necessary, the cross-piece portion 39 is spaced above the inner piping a distance sufficient to permit radial movement of the inner piping relative to the outer piping. In other instances, the cross-piece portion 39 is spaced closely to the inner piping to prevent or permit only limited radial movement of the inner piping, which may be necessary to control buckling of the inner piping during operation of the double-containment assembly. This embodiment of the flexibility support 34 is only exemplary, however, and as is made evident in the above-described patent applications, there are numerous other embodiments of flexibility supports that can adequately permit axial, lateral, and if necessary, radial movements of the inner piping components relative to the outer piping components in the double-containment assemblies of the present invention.

Beyond a predetermined distance from the elbow fittings, such as the elbow fitting 24, the use of the flexibility supports 34 may have only minimal effect, and beyond this distance, axial-guiding interstitial supports 36 which restrict lateral movement of the inner piping and function as axial guides are used instead. The axial-guiding supports 36 are spaced a predetermined distance relative to each other, and are preferably equally spaced from the first axial-guiding support relative to the elbow fitting to the respective intermediate anchor 30 or 32, as is described further below.

The axial-guiding supports 34 are preferably of the type disclosed in co-pending U.S. patent application Ser. No. 07/885,670, filed Aug. 17, 1992, entitled "Centering Support For Double-Containment Pipe Assembly", now U.S. Pat. No. 5,404,914, and which is hereby expressly incorporated by reference as part of the present disclosure. A typical axial-guiding support 36 is illustrated in FIG. 1B, and includes a base portion 43 defining a first curved surface 45 for seating the inner piping 12 or 14, and a clamp portion 47 defining a second curved surface 49 for engagement with the substantially opposite side of the inner piping relative to the first curved surface 45. As shown in FIG 1B, the axial-guiding support 36 includes a pair of fasteners for attaching the clamp portion 47 to the base portion 45 to fix the support to the inner piping.

Each axial-guiding support 36 is moveable relative to the outer piping to permit axial movement of the inner piping relative to the outer piping. However, because each axial-guiding support 36 is secured to the inner piping, and extends between the inner piping and the outer piping, the support prevents lateral and/or radial movement of the inner piping relative to the outer piping in the area of the respective support. As shown in FIG. 1B, the axial-guiding support 36 includes a semi-circular cutout in the clamp portion 47, and a flat chord cut in the base portion 45 to permit fluid flow, if necessary, through the annulus between the inner and outer piping. Each axial-guiding support 36 may also include a layer of elastomeric material between each of the curved surfaces 45 and 49 and the inner piping to facilitate in dampening any vibrational movements of the inner piping.

Other types of axial-guiding supports that may be employed as the supports 36 are disclosed in co-pending U.S. patent application Ser. No. 08/088,864, now U.S. Pat. No. 5,400,828, entitled "Double-Containment Piping Supports For Improved Annulus Flow", filed on Jul. 8, 1993, which is also hereby expressly incorporated by reference as part of the present disclosure.

These types of axial-guiding supports are only exemplary, and as is evident in the above-identified patent applications, there are numerous embodiments of axial-guiding supports that permit axial movement of the inner and outer piping components relative to each other, but prevent lateral and/or radial movements of the inner piping relative to the outer piping, which may be employed in the double-containment assemblies of the present invention.

Figure 2:
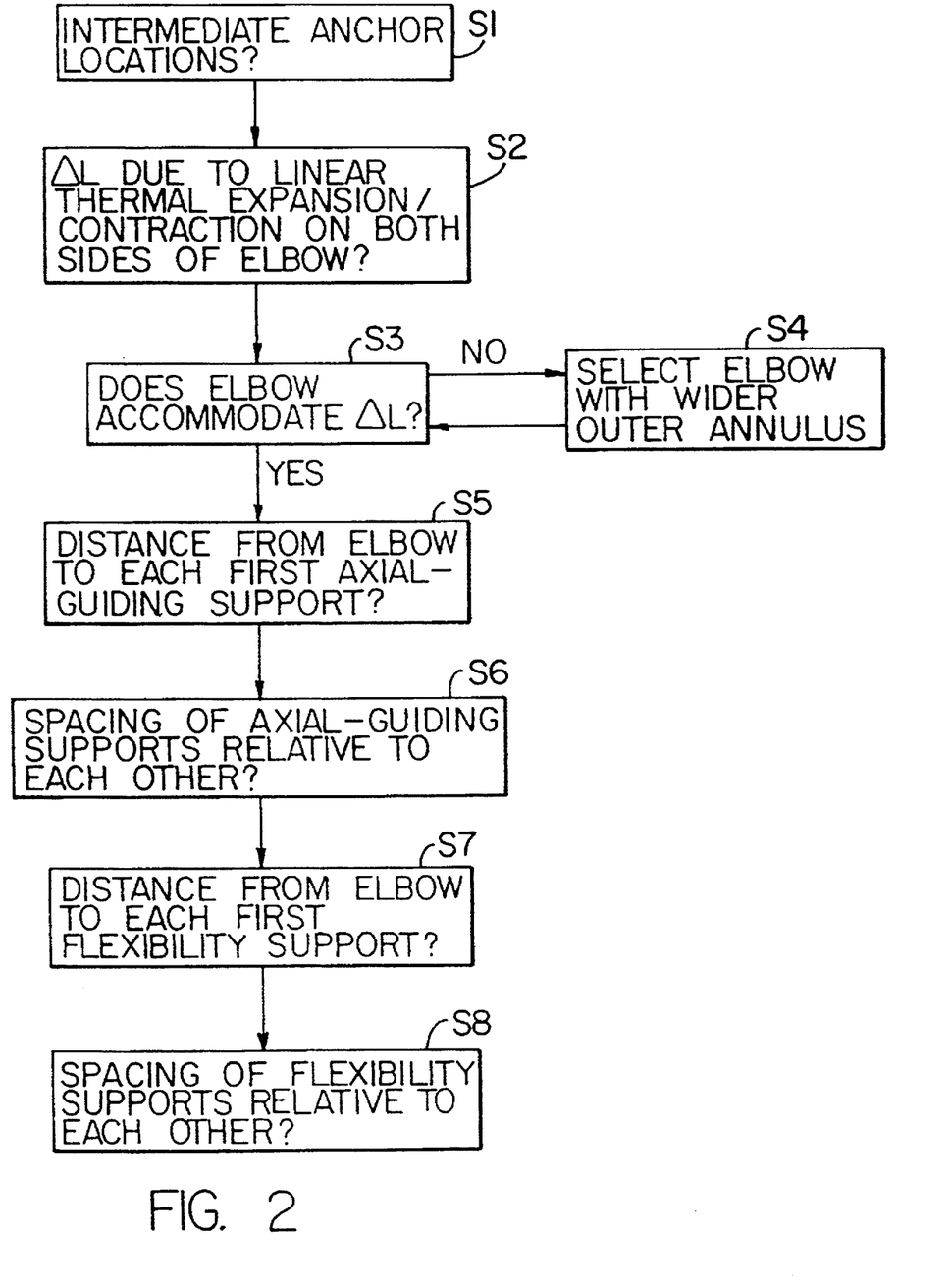
FIG. 2 is a flow chart illustrating conceptually the procedural steps for constructing a double-containment assembly in accordance with the present invention.

In FIG. 2, a flow chart illustrates conceptually the procedural steps in constructing the double-containment assemblies in accordance with the present invention. The first step is to determine the locations of the intermediate anchors, which in FIG. 1 are the termination fittings 30 and 32, as indicated as S1 in FIG. 2. Typically, the intermediate anchors are located approximately at the mid-point of each respective straight section of piping, or half-way between elbow fittings, or other directional changes in the double-containment assembly. This may not always be the case, however, depending upon any unusual requirements of a particular system. As shown in FIG. 1, the first termination fitting 30 is located a distance L1 from the centerline of the second inner and outer pipe sections 14 and 20, and the second termination fitting 32 is located a distance L2 from the centerline of the first inner and outer pipe sections 12 and 18.

Once the intermediate anchor locations are selected (L1 and L2), this is the starting point for determining the locations of the interstitial supports within the double-containment assembly. The next step is to determine the expected overall changes in dimension due to thermal expansion or contraction of the straight sections (or legs) on either side of the elbow fitting, as indicated by S2 in FIG. 2. The expected change in linear dimension of each respective straight pipe section is determined based on the following equation:

$$\Delta L = C \times \Delta T \times L \tag{1}$$

wherein $\Delta L$ is the expected change in linear dimension of the respective inner or outer straight section of pipe;

C is the coefficient of thermal expansion of the respective inner or outer section of pipe, which is based on the material of construction of the pipe;

$\Delta T$ is the expected change in temperature of each respective section of pipe during operation of the double-containment assembly 10; and L is the length of the respective straight section of inner or outer pipe, i.e., the distance from the face of the intermediate anchor 30 or 32 to the centerline of the inner and outer straight sections on the other side of the elbow fitting.

The expected change in temperature ($\Delta T$) for each inner section of pipe is typically based on the expected change in temperature of the fluid passed through the inner pipe, or the change in temperature when fluid is being transported within the inner piping as compared to the temperature of the system at installation and/or when fluid is not being transported. With respect to the outer sections of piping, the expected change in temperature ($\Delta T$) is typically based on the expected change in the surrounding or ambient temperature of the outer piping from the installation temperature, which is subject to greater fluctuations in aboveground, outdoor systems, as opposed to underground systems.

For aboveground systems, in which the outer piping is not restrained relative to the inner piping, the overall change in linear dimension ($\Delta L$) for each leg of the double-containment assembly is determined by separately calculating the change in linear dimension of the respective inner straight pipe section, and the change in linear dimension of the respective outer straight pipe section in accordance with equation (1) above, and the difference between the two is the overall change in linear dimension of that leg ($\Delta L$).

For underground systems, in which the outer piping components are restrained relative to the inner piping components, or aboveground systems in which the outer piping components are restrained relative to the inner piping components, the change in linear dimension of the outer piping sections due to thermal expansion or contraction is de minimis, if not zero. Therefore, in these systems, the overall change in linear dimension ($\Delta L$) for each leg of the double-containment assembly is calculated using equation (1) above for only the inner piping sections.

Once $\Delta L$ is determined for each leg of the double-containment assembly, the next step is to determine whether there is sufficient space provided in the outer annulus 26 of the elbow fitting 24 to accommodate the expected overall thermal expansion or contraction of each leg coupled to the elbow fitting, as indicated by S3 in FIG. 2. In other words, the overall change in linear dimension ($\Delta L$) for each of the straight pipe sections must be less than the space provided in the outer annulus 26 in the axial direction of the piping in order to accommodate such thermal expansion or contraction, without permitting the inner and outer elbow sections to contact each other, which could lead to a rupture in the piping. If the outer annulus space 26 is insufficient to accommodate the expected overall thermal expansion or contraction ($\Delta L$), then the next step is to select a new elbow fitting 24 which provides a sufficiently wide outer annulus space 26 to accommodate the overall $\Delta L$, as indicated by S4.

The next step is to determine the location of each of the first axial-guiding supports 36 with respect to the elbow fitting 24, as indicated by S5 in FIG. 2. The location of the first axial-guiding support 36 on the right side of the elbow fitting 24 in FIG. 1 is indicated as L3, which is the distance from the centerline of the inner and outer straight sections of pipe 14 and 20 to the mid-point of the respective first axial-guiding support. The location of the first axial-guiding support 36 on the left side of the elbow fitting 24 in FIG. 1 is indicated as L4, which is the distance from the centerline of the inner and outer straight sections of pipe 12 and 18 to the mid-point of the respective first axial-guiding support. The distances L3 and L4 are each determined based on the following equation:

$$L=[(\Delta L \times OD \times 10^6)/1.6S]^{1/2} \qquad (2)$$

wherein L is either L3 or L4, i.e., the distance from the centerline of the straight sections of pipe on the opposite side of the elbow fitting to the mid-point of the respective axial-guiding support;

$\Delta L$ is the expected overall change in linear dimension of the inner and outer straight pipe sections on the opposite side of the elbow fitting 24, as determined above based on equation (1);

OD is the outside diameter of the inner pipe; and

S is the maximum desired stress for the elbow fitting 24. As an example, for an elbow fitting of ferrous-based material, the maximum allowable stress is within the range of approximately 10,000 to 30,000 psi.

The distances L3 and L4 determined in accordance with equation (2) above define the minimum distances from the elbow fitting at which the first axial-guiding supports 36 can be located. It may be desirable to locate each first axial-guiding support 36 at a distance greater than L3 or L4, respectively, depending upon the requirements of a particular system. For example, in order to have substantially equal spacing between the axial-guiding supports, it may be desirable to locate the first axial-guiding support at a distance greater than L3 or L4, depending upon the distance between L3 or L4 and the respective internal anchor. It is not recommended, however, to locate either of the first axial-guiding supports closer to the elbow fittings than the positions defined by the distances L3 or L4.

Once the distances L3 and L4 are determined, the next step is to determine the locations of the additional axial-guiding supports 36 between each first axial-guiding support 36 and the adjacent termination fitting 30 or 32, as indicated by S6 in FIG. 2. The additional axial-guiding supports 36 are substantially equally spaded a distance L5 relative to each other based on the following equations:

$$L=[(76.9Y \times E \times I)/W]^{1/4} \qquad (3a)$$

or $$L=[(185.2Y \times E \times I)/W]^{1/4} \qquad (3b)$$

or $$L=[(144.9Y \times E \times I)/W]^{1/4} \qquad (3c)$$

or $$L=[(153.8Y \times E \times I)/W]^{1/4} \qquad (3d)$$

wherein:

L is the spacing between adjacent axial-guiding supports (L5 in FIG. 1);

Y is the mid-span vertical displacement or sag due to the weight of the inner piping (a span is a section of pipe between supports);

E is the modulus of elasticity of the inner piping material (psi) at the maximum expected inner-piping temperature;

I is the moment of inertia of the respective inner pipe section ($in^4$); and

W is the unit weight of the inner piping when filled with the fluid that is being transported.

One of equations 3a through 3b is selected based on the number of spans within a respective straight pipe section, wherein one span is defined as one section of pipe between points of support. Equation (3a) is employed if there is only one span; equation (3b) is employed if there are two spans; equation (3c) is employed if there are three spans; and equation (3d) is employed if there are four or more spans.

The next step is to determine the location of each of the first flexibility supports 34 with respect to the elbow fitting 24, as indicated by S7 in FIG. 2. The first flexibility support 34 on the right side of the elbow fitting 24 in FIG. 1 is located a distance L6 from the centerline of the straight pipe sections on the opposite side of, the elbow fitting, and the first flexibility support 34 on the left side of the elbow fitting in FIG. 1 is located a distance L7 from the centerline of the straight pipe sections on the opposite side of the elbow fitting. The distances L6 and L7 are selected so that the sum of L6 and L7 (L6+L7) is less than or equal to approximately three-quarters of L5 (0.75×L5). Typically, L6 and L7 are substantially equal; however, in certain instances one may be greater than the other, depending upon the unique considerations of a particular system.

The other flexibility supports 34 are substantially equally spaced relative to the first flexibility supports 34 or each other a distance L8, between each first flexibility support and the respective first axial-guiding support 36, as shown in FIG. 1 and indicated as step S8 in FIG. 2. The distance L8 is determined in accordance with equations (3a)–(3d) above, and is equal to L5.

One advantage of the double-containment assemblies constructed in accordance with the procedural steps of the present invention, is that the system is inherently flexible in order to accommodate movements of the inner and outer piping components relative to each other in response to differential thermal expansion or contraction, or other effects causing movements of the inner and outer piping components relative to each other. Each of the fittings and supports is suited to accommodate specific types of movements of the piping components relative to each other, and the location of each fitting or support is selected in order to adequately support the piping components, yet to permit movements of the inner and outer piping components relative to each other and avoid the failures normally associated with prior art, restrained double-containment systems.

The intermediate anchors control the direction of expansion or contraction of the piping components so that the changes in linear dimensions of the straight pipe sections accumulate at the elbow fittings located between the termination fittings. The elbow fittings are uniquely designed to in turn accommodate the movements of the inner and outer piping components relative to each other by permitting displacement of the inner and outer elbow sections relative to each other without contacting each other. The flexibility supports are located adjacent to the elbow sections to accommodate the greater extent of relative movements in the areas of the elbow fittings, because the flexibility supports permit axial, lateral, and if desired, radial movements of the inner piping components relative to the outer piping components, while also supporting the inner piping components within the outer piping components. The axial-guiding supports are located between the flexibility supports and the intermediate anchors to permit axial movement of the inner and outer piping components relative to each other to accommodate linear expansion or contraction of the inner and outer piping components. The axial-guiding supports also substantially prevent other movements of the inner and outer piping components relative to each other in order to guide the piping into the elbow section to ensure proper compensation.

Figure 3:
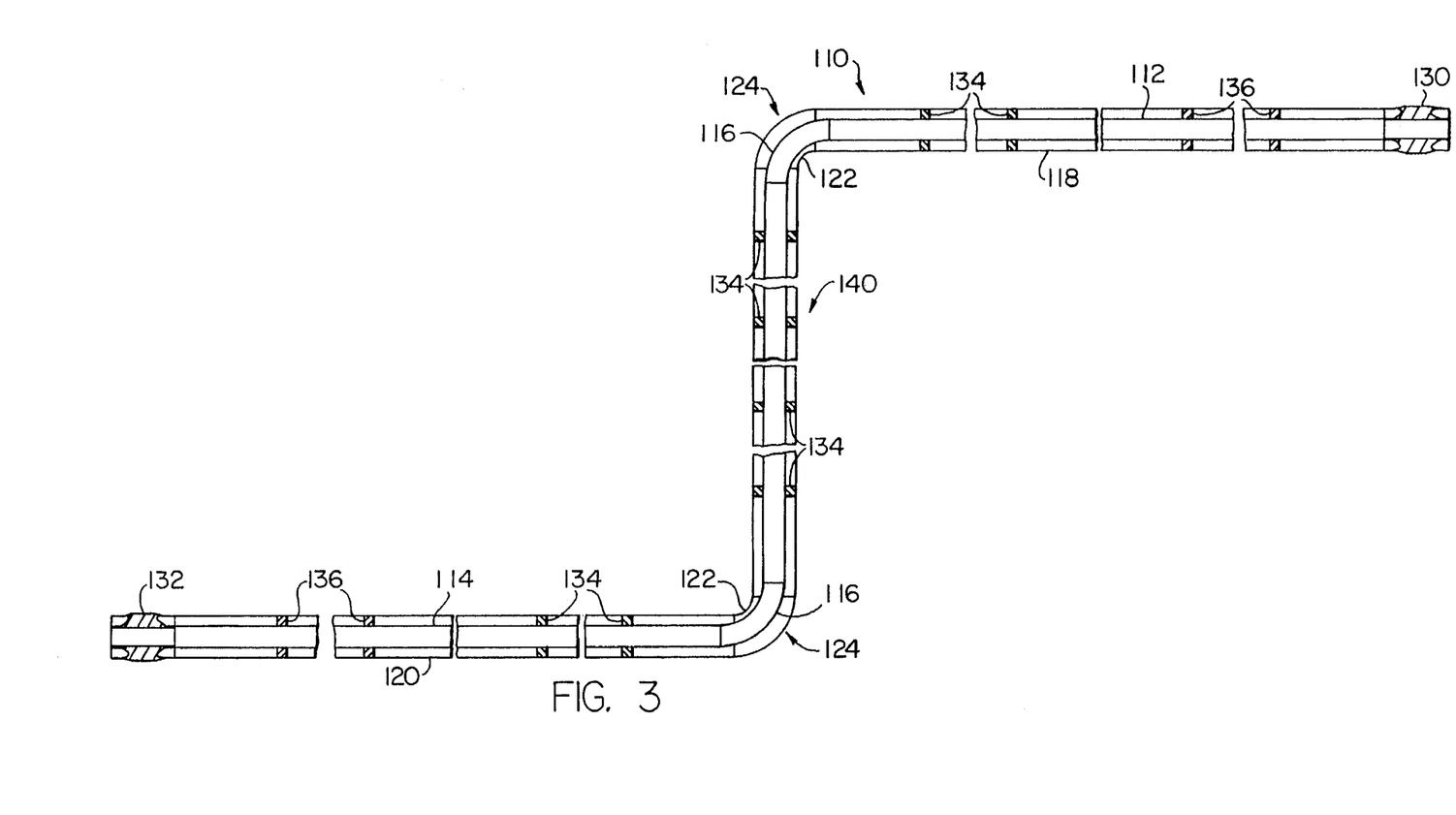
FIG. 3 is a partial schematic, cross-sectional view of another embodiment of a double-containment assembly of the present invention including an offset leg.

Turning to FIG. 3, another double-containment assembly embodying the present invention is indicated generally by the reference numeral 110. The double-containment assembly 110 includes the same components as the assembly 10 described above in connection with FIG. 1, and therefore like reference numerals preceded by the numeral 1 are used to indicate like elements. The double-containment assembly 110 is an offset assembly, including an offset leg 140 coupled between two elbow fittings 124. The offset leg 140 is a relatively short span of straight pipe, and is substantially shorter in length than either of the straight sections (or legs) located between the other side of each elbow fitting 124 and a respective termination fitting 130 or 132. Because the offset leg 140 is relatively short in length, it does not include any axial-guiding supports like the axial-guiding supports 136. Rather, the only interstitial supports located within the offset leg 140 are flexibility supports 134, permitting axial, lateral, and if desired, radial movements of the inner piping components relative to the outer piping components. Based on equation (2) above, there is insufficient distance between the two elbow fittings 124 to mount an axial-guiding support like the supports 136 between the elbow fittings.

In this type of offset embodiment of the present invention, when determining the locations of the first axial-guiding supports 136 with respect to the adjacent elbow fittings 124, equation (2) above is employed. However, the change in linear dimension ($\Delta L$) used to determine the distance L in equation (2) is the change in linear dimension for the straight pipe section on the other side of the respective elbow fitting employing axial-guiding supports, i.e., the leg on the other side of the offset leg 140. The location of each first flexibility support 134 within the offset leg 140 with respect to the adjacent elbow fitting 124 is determined in the same manner as described above in connection with the flexibility supports 34 illustrated in FIG. 1.

Figure 4:
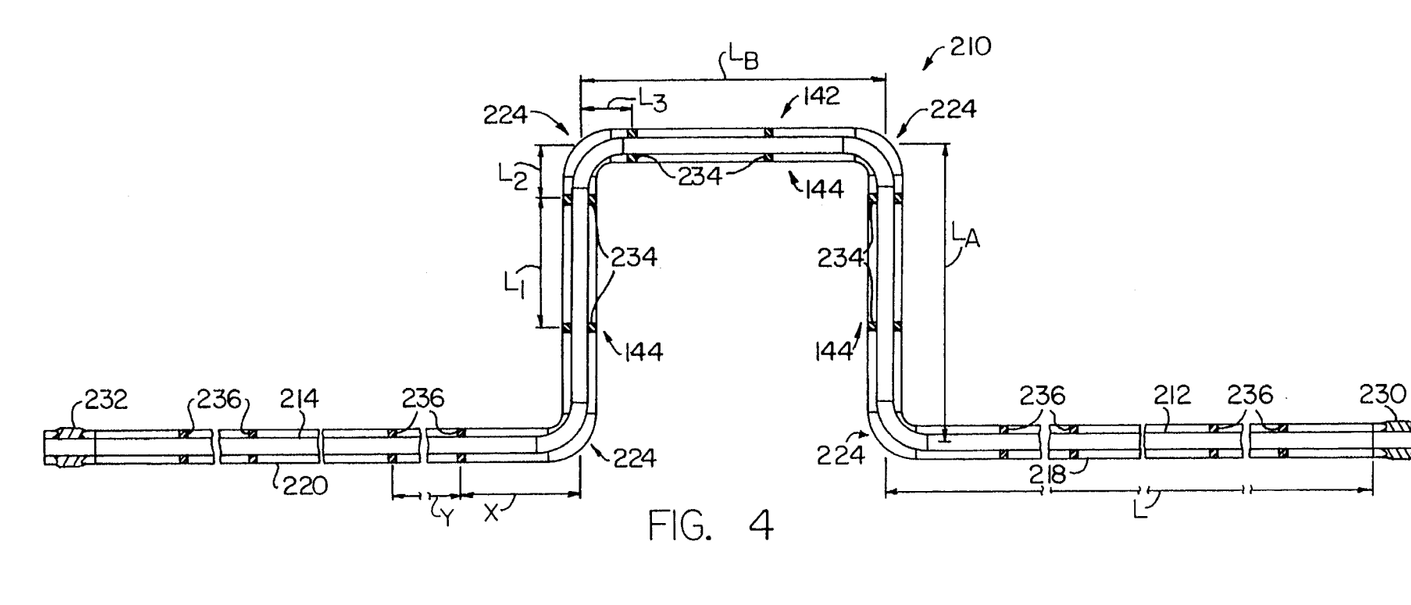
FIG. 4 is a partial schematic, cross-sectional view of another embodiment of a double-containment assembly of the present invention including an expansion loop.

In FIG. 4, another double-containment assembly embodying the present invention is indicated generally by the reference numeral 210. The components employed within the double-containment assembly 210 are the same as the components employed in the double-containment assembly 110 described above and illustrated in FIG. 3, and therefore like reference numerals preceded by the numeral 2 instead of the numeral 1 are used to indicate like elements. The double-containment assembly 210 differs from the double-containment assembly 110 in that instead of an offset construction, the double-containment assembly 210 forms an expansion loop 142 between two sections of straight pipe. The expansion loop 142 is formed by four elbow fittings 224 and three expansion legs 144 coupled between the four elbow fittings. As can be seen, each expansion leg 144 is relatively short in length in comparison to the other straight sections of pipe, and none of the expansion legs are long enough (based on equation (2) above) to accommodate an axial-guiding support like the axial-guiding supports 36 described above and illustrated in FIG. 1. The length $L_A$ of each of the two parallel legs 144 of the expansion loop 142 is determined based on the following equation:

$$L_A = [(0.75 \times \Delta L \times E \times D)/S]^{1/2}$$

wherein:

$L_A$ is the length of each of the two parallel legs of the expansion loop.

ΔL is the overall change in the linear dimension of the adjacent leg leading into the expansion loop due to expected thermal expansion or contraction calculated in accordance with equation (1) above, i.e., the overall change in linear dimension of the respective straight section of piping on the other side of the respective elbow fitting. For underground systems, the overall change in linear dimension is the overall change in linear dimension of the inner straight section of piping. For aboveground systems, wherein the outer piping is not constrained with respect to the inner piping, the overall change in linear dimension is the difference between the change in linear dimension of the outer straight section of piping and the change in linear dimension of the inner straight section of piping.

E is the modulus of elasticity of the piping material at the coolest expected temperature of operation of the piping for which the expected ΔL is determined.

D is the outside diameter of the piping for which the expected ΔL is determined.

S is the maximum desired working stress at operating temperatures of the piping for which the expected ΔL is determined.

The length $L_B$ of the expansion leg 144 extending between the two parallel expansion legs 144, as shown in FIG. 4, is preferably equal to approximately one-half of $L_A$ (0.5×$L_A$).

The location of each flexibility support 234 within the expansion loop 142 is preferably determined in the same manner as with the flexibility supports 34 described above in connection with FIG. 1. The distance L1 between the flexibility supports 234 is determined by employing equation (3) above, and the location of each first flexibility support with respect to the adjacent elbow fitting 224, e.g., L2 and L3 in FIG. 4, is determined so that the sum of L2 and L3 (L2+L3) is less than or equal to three-fourths of L1 in FIG. 4 [(L2+L3)≦(0.75×L1).

With most double-containment assemblies including an expansion loop as illustrated in FIG. 4, it is desirable to have little, if any lateral or radial movement of the inner straight pipe sections 212 and 214 relative to the outer straight pipe sections 218 and 220 in the areas adjacent to the elbow fittings 224. Instead, it is desirable to have substantially all bending absorbed by the elbows 224 and legs 144 of the expansion loop. Accordingly, it is not necessary to employ the flexibility supports 234 on either side of the expansion loop 142 (as opposed to within the expansion loop), since there is no need to accommodate lateral or radial movement of the inner piping in this area. Thus, in many such instances, the flexibility supports 234 are optional in these areas, although a flexibility support may be used instead of an axial-guiding support, if desired.

The distance X of the first axial-guiding support 236 with respect to each elbow fitting 224 (or the location of the first flexibility support 234 used instead of an axial-guiding support), which is the linear distance measured from the centerline of the adjacent expansion leg 144, is selected so that it is no greater than approximately 4 times the diameter of the inner piping. The second axial-guiding support 236 with respect to each elbow fitting is spaced a distance Y from the first axial-guiding support, which is no greater than approximately 14 times the diameter of the inner piping. The remaining axial-guiding supports 236 located between the second axial-guiding support 236 and the respective intermediate anchor 230 or 232 are substantially equally spaced relative to each other by a distance calculated in accordance with equations (3a)–(3d) above.

The expansion loop of the double-containment assembly 210 is advantageous for accommodating differential thermal expansion or contraction between the inner and outer piping components of an otherwise straight double-containment assembly. As described above, each of the four elbow fittings 224 is adapted to absorb differential thermal expansion or contraction of the inner piping components relative to the outer piping components by movement of the inner elbow section relative to the outer elbow section within the expanded outer annulus space 226. The expansion loop is therefore adapted to accommodate the differential thermal expansion or contraction of the piping components located between the intermediate anchors 230 and 232. By employing these types of expansion loops, offsets, and/or elbow fittings in accordance with the present invention, the outer diameter of the piping components can be minimized, resulting in space and material cost savings, while still accommodating differential thermal expansion or contraction of the inner and outer piping components relative to each other.

Figure 5:
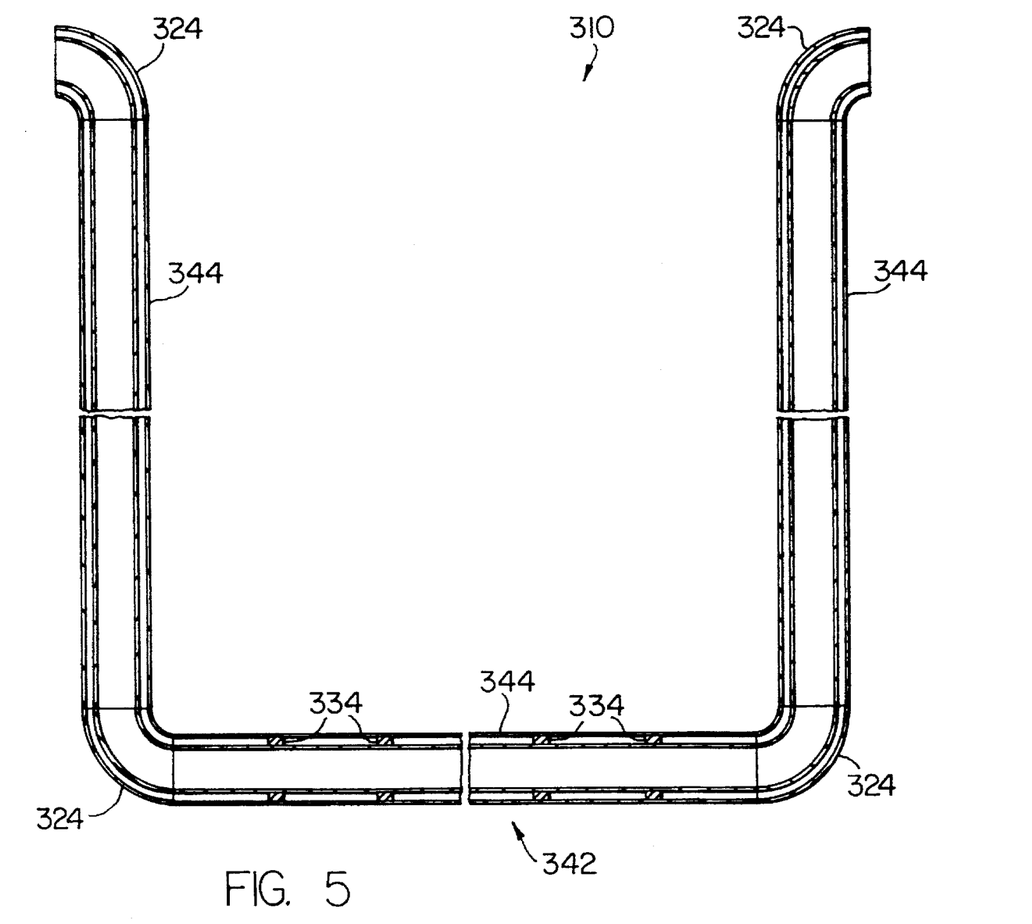
FIG. 5 is a partial schematic, cross-sectional view of another embodiment of a double-containment assembly of the present invention including an expansion loop oriented substantially in a vertical plane.

Turning to FIG. 5, another double-containment assembly embodying the present invention is indicated generally by the reference numeral 310. The double-containment assembly 310 employs many of the same components as the double-containment assembly 210 described above in connection with FIG. 4, and therefore like reference numerals preceded by the numeral 3 instead of the numeral 2 are used to indicate like elements. Like the double-containment assembly 210 described above, the double-containment assembly 310 includes an expansion loop formed by four elbow fittings 324 and three expansion legs 344 coupled between the four elbow fittings. This embodiment of the present invention differs from the embodiments described above, in that the expansion loop is located in a substantially vertical plane, whereas the expansion loop described above is located in a generally horizontal (or inclined, if necessary) plane. Thus, the center expansion leg 344 is oriented substantially horizontal, whereas the two parallel, side expansion legs are oriented substantially vertical. As can be seen, the vertical expansion legs 344 do not include any flexibility supports 334 (or any other type of interstitial supports), whereas the horizontal expansion leg 344 includes flexibility supports 334 substantially equally spaced relative to each other in the same manner as the flexibility supports 234 employed in the expansion loop of the double-containment assembly 210 described above. When determining the factors based on the weight of the inner piping of the horizontal expansion leg, however, it is appropriate to include the weight of the inner piping of each of the vertical expansion legs, which are also supported by the flexibility supports 334 in the horizontal expansion leg.

Figure 6:
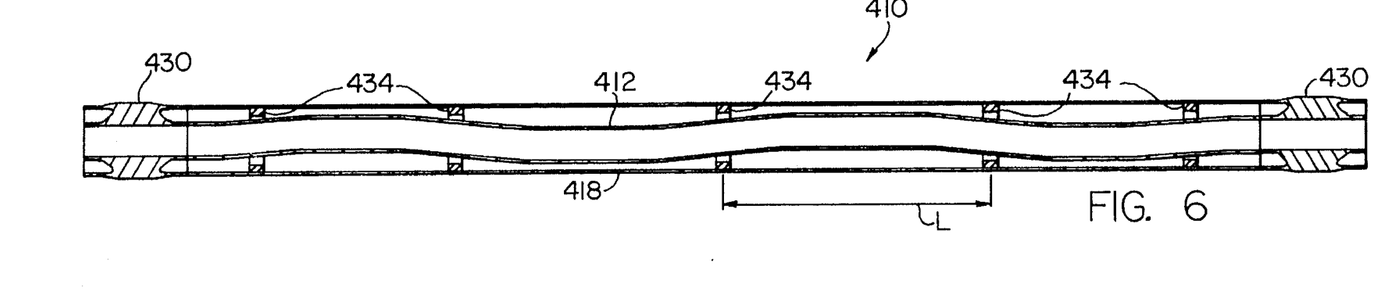
FIG. 6 is a partial schematic, cross-sectional view of another embodiment of a double-containment assembly of the present invention including only straight sections of piping coupled between intermediate anchors.

Turning to FIG. 6, another double-containment assembly embodying the present invention is indicated generally by the reference numeral 410. The double-containment assembly 410 includes many of the same components as the double-containment assemblies described above, such as the double-containment assembly 10 illustrated in FIG. 1, and therefore like reference numerals preceded by the numeral 1 are used to indicate like elements.

In this embodiment of the present invention there are no directional changes, such as offsets or expansion loops, but rather only straight pipe sections coupled between intermediate anchors, which in this embodiment of the present invention are termination fittings 430. A first flexibility support 434 is located approximately at the mid-point between the two termination fittings 430, and the other flexibility supports 434 are substantially equally spaced a distance L relative to each other between the first flexibility support 434 and each of the termination fittings 430. The spacing L is determined based on equations (3a)–(3d) above in the same manner as described for determining the spacing between the flexibility supports 34 in FIG. 1. In this embodiment of the present invention the flexibility supports 434 are advantageously employed between fixed anchor points to permit the primary piping to deflect between the fixed anchor points into a substantially sinusoidal shape, for example, as illustrated in FIG. 6, to accommodate differential thermal expansion of the inner piping components relative to the outer piping components.

In the embodiment of the present invention illustrated in FIG. 6 it may be possible to also employ axial-guiding supports, like the axial-guiding supports 36 described above in connection with FIG. 1, located between the flexibility supports 434 and the termination fittings 430, if there is sufficient distance between the termination fittings to accommodate such supports. Equation (1) above is employed to determine the distance from the first flexibility support 434 (preferably located approximately at the mid-point between the termination fittings 430) and the first axial-guiding support spaced away from the first flexibility support. If the distance between the first flexibility support and a respective termination fitting is greater than the calculated distance for the first axial-guiding support, then the axial-guiding supports may be mounted between the flexibility supports and the termination fittings in the same manner as described above for the axial-guiding supports 36 illustrated in FIG. 1.

What is claimed is:

1. A double-containment assembly, comprising:

a first anchor support;

at least one elbow fitting including an inner elbow section contained within an outer elbow section, and defining an unobstructed annulus between the inner and outer elbow sections permitting movement of the inner elbow section relative to the outer elbow section;

a first inner pipe section coupled between the first anchor support and the inner elbow section;

a first outer pipe section coupled between the first anchor support and the outer elbow section;

a first axial-guiding support spaced a first predetermined distance from the at least one elbow fitting and supporting the first inner pipe section within the first outer pipe section and including means for permitting axial movement of the first inner pipe section and first outer pipe section relative to each other and substantially preventing lateral movement of the first inner pipe section relative to the first outer pipe section; and a first flexibility support spaced a second predetermined distance from the elbow fitting less than the first predetermined distance and supporting the first inner pipe section within the first outer pipe section and including means for permitting axial and lateral movement of the first inner pipe section relative to the first outer pipe section.

2. A double-containment assembly as defined in claim 1, further comprising:

a second anchor support;

a second inner pipe section coupled between the second anchor support and the inner elbow section on the opposite side of the inner elbow section relative to the first inner pipe section;

a second outer pipe section coupled between the second anchor support and the outer elbow section on the opposite side of the outer elbow section relative to the first outer pipe section;

a second axial-guiding support spaced a third predetermined distance from the elbow fitting and supporting the second inner pipe section within the second outer pipe section and including means for permitting axial movement of the second inner pipe section and second outer pipe section relative to each other and substantially preventing lateral movement of the second inner pipe section relative to the second outer pipe section; and a second flexibility support spaced a fourth predetermined distance measured from the elbow fitting less than the third predetermined distance and supporting the second inner pipe section within the second outer pipe section and including means for permitting axial and lateral movement of the second inner pipe section relative to the second outer pipe section.

3. A double-containment assembly as defined in claim 1, wherein the first predetermined distance is based on an expected overall change in linear dimension due to temperature changes of inner and outer pipe sections coupled to the elbow fitting on the opposite side of the elbow fitting relative to the first inner and outer pipe sections.

4. A double-containment assembly as defined in claim 1, comprising a plurality of first axial-guiding supports substantially equally spaced relative to each other in a portion of the first inner and outer pipe sections located between the first predetermined distance from the elbow fitting and the first anchor support.

5. A double-containment assembly as defined in claim 4, wherein the distance between adjacent axial-guiding supports is based on the deflection of the first inner pipe section in a vertical plane due to the weight of the first inner pipe section.

6. A double-containment assembly as defined in claim 5, wherein the distance between axial-guiding supports is also based on a unit weight of the inner piping when filled with a fluid that is being transported.

7. A double-containment assembly as defined in claim 1, comprising a plurality of first flexibility supports substantially equally spaced relative to each other between the second predetermined distance from the elbow fitting and the first axial-guiding support.

8. A double-containment assembly as defined in claim 7, wherein the distance between adjacent flexibility supports is based on the deflection of the first inner pipe section in a vertical plane due to the weight of the first inner pipe section.

9. A double-containment assembly as defined in claim 8, wherein the distance between flexibility supports is also based on a unit weight of the inner piping when filled with a fluid that is being transported.

10. A double-containment assembly as defined in claim 7, wherein the second predetermined distance is less than the spacing between adjacent flexibility supports.

11. A double-containment assembly as defined in claim 10, wherein the second predetermined distance is less than approximately three-fourths of the spacing between adjacent flexibility supports.

12. A double-containment assembly as defined in claim 2, comprising a plurality of at least one of the first flexibility supports and the first axial-guiding supports within the first inner and outer pipe sections, wherein the sum of the second and fourth predetermined distances is less than the spacing between the plurality of flexibility or axial-guiding supports.

13. A double-containment assembly as defined in claim 1, comprising a first elbow fitting and a second elbow fitting, and an offset leg coupled between the first and second elbow fittings, the offset leg including an inner pipe section coupled between the inner elbow sections and an outer pipe section coupled between the outer elbow sections.

14. A double-containment assembly as defined in claim 13, wherein the offset leg includes at least one flexibility support mounted between the inner and outer pipe sections of the offset leg, and including means for permitting axial and lateral movement of the inner pipe section relative to the outer pipe section of the offset leg.

15. A double-containment assembly as defined in claim 14, including a plurality of flexibility supports mounted between the inner and outer pipes of the offset leg and substantially equally spaced relative to each other.

16. A double-containment assembly as defined in claim 15, wherein the distance between adjacent flexibility supports in the offset leg is based on the deflection of the inner pipe section of the offset leg in a vertical plane due to the weight of that inner pipe section and a unit weight of the inner piping of the offset leg when filled with a fluid that is being transported.

17. A double-containment assembly as defined in claim 1, further comprising an expansion loop coupled to the other side of the elbow fitting relative to the first inner and outer pipe sections, the expansion loop including three expansion legs, and elbow fittings coupled between the expansion legs, each expansion leg including inner and outer straight sections of pipe coupled to corresponding inner and outer elbow sections.

18. A double-containment assembly as defined in claim 17, wherein each expansion leg includes at least one flexibility support mounted between the inner and outer pipe sections of the respective expansion leg, and including means for permitting axial and lateral movement of the inner pipe relative to the outer pipe of the expansion leg.

19. A double-containment assembly as defined in claim 18, wherein each expansion leg includes two flexibility supports, wherein the distance between one flexibility support and an adjacent elbow fitting is less than the distance between adjacent flexibility supports.

20. A double-containment assembly as defined in claim 19, wherein one expansion leg includes a first flexibility support mounted on one side of an elbow fitting and an adjacent expansion leg includes a first flexibility support mounted on the other side of the elbow fitting, and the sum of the distances between each first flexibility support and the elbow fitting is less than the distance between adjacent flexibility supports.

21. A double-containment assembly as defined in claim 17, wherein the expansion loop includes two substantially parallel expansion legs, and a middle expansion leg coupled between the two parallel expansion legs, and the length of the middle expansion leg is less than approximately three-fourths of the length of each of the parallel expansion legs.

22. A double-containment assembly as defined in claim 17, wherein the expansion loop includes a middle expansion leg coupled between the other two expansion legs, and the middle expansion leg is located at a different elevation than the first inner and outer pipe sections.

23. A double-containment assembly as defined in claim 22, wherein the expansion loop includes at least one flexibility support mounted between the inner and outer pipes of the middle expansion leg, and defines a substantially unobstructed space throughout each annulus between the inner and outer pipes of the other two expansion legs.

* * * * *

UNITED STATES PATENT AND TRADEMARK OFFICE
CERTIFICATE OF CORRECTION

PATENT NO. : 5,482,088
DATED : January 9, 1996
INVENTOR(S) : Christopher G. Ziu

It is certified that error appears in the above-indentified patent and that said Letters Patent is hereby corrected as shown below:

On the title page, item [54] and column 1, the title should read --

" DOUBLE-CONTAINMENT SYSTEMS WITH AXIAL-GUIDING AND FLEXIBILITY SUPPORTS ".

Signed and Sealed this

Eighteenth Day of June, 1996

Attest:

BRUCE LEHMAN

Attesting Officer

Commissioner of Patents and Trademarks